INVENTOR:
James R. Hauer
By William W. Rundle
AGENT

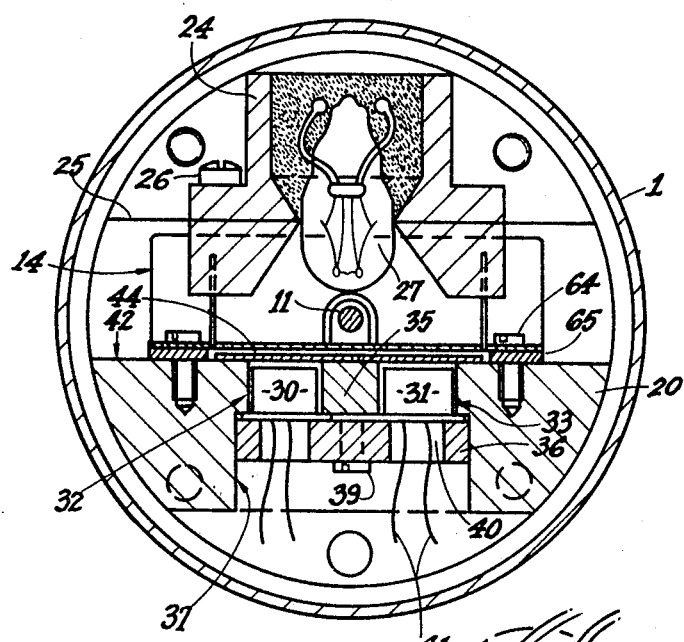
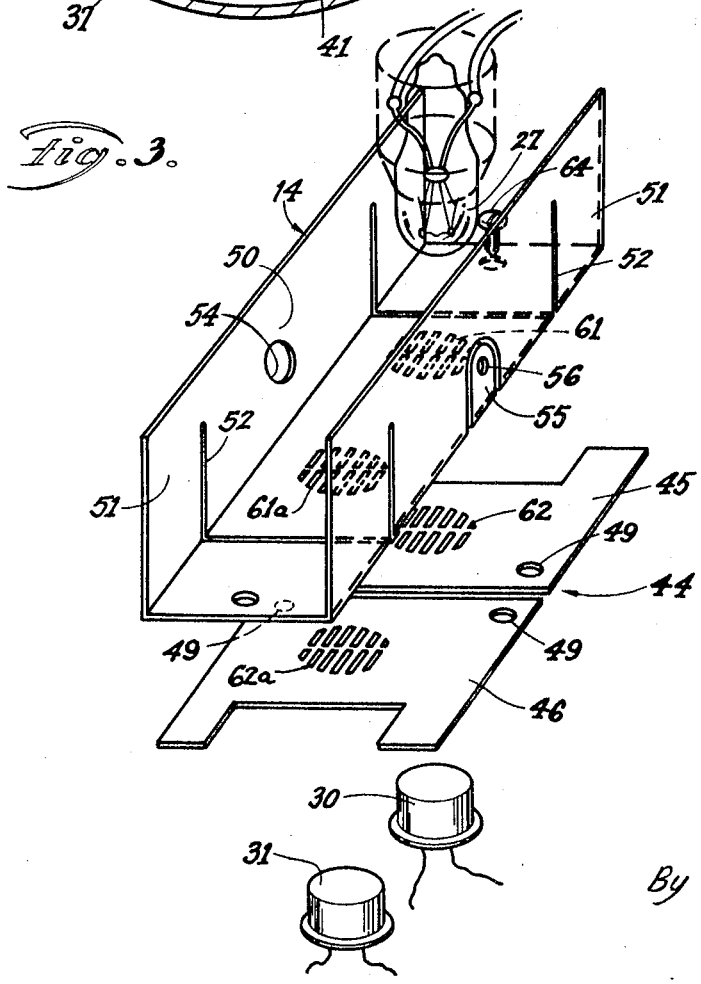

United States Patent Office 3,457,426
Patented July 22, 1969

3,457,426
OPTICAL PICK-OFF PRESSURE TRANSDUCER HAVING FIXED SHUTTER AND MOVABLE SHUTTER HAVING FIXED PORTION
James R. Hauer, Granada Hills, Calif., assignor to Northrop Corporation, Beverly Hills, Calif., a corporation of California
Filed May 28, 1965, Ser. No. 459,748
Int. Cl. G01d 5/34
U.S. Cl. 250—231                    4 Claims

ABSTRACT OF THE DISCLOSURE

The movable output member of a pressure-responsive device or other sensor is connected to a special optical pick-off for producing an electrical signal output. The pick-off structure features insensitivity to vibration and frictionless operation, by providing a pair of closely spaced light shutters made of very thin sheet-like material having slits therein for passing varying amounts of light from a lamp to a photocell type unit. One shutter is movable with respect to the other. However, they are integrally mounted, and the aforesaid movement consists of the elastic flexing of the movable shutter portion.

---

The present invention relates to transducers, and more particularly, to an optical pick-off means for converting motion or position to an electrical output. The motion may be produced by any of various forms of input signals to be measured, such as pressure, acceleration, velocity, and flow displacement, for example.

Regarding pressure transducers, the requirements that such devices be insensitive to vibration cannot be met by conventional sensors. Problems of friction in operation also render presently known devices unsuitable for the high accuracy, extreme low range resolution, and noise-free output attending space-age requirements.

Accordingly, it is an object of this invention to provide a signal transducer of rugged and simple construction capable of meeting severe environmental conditions such as shock and vibration.

Another object is to provide a transducer pick-off means which is frictionless.

Still another object is to provide such a transducer capable of measuring very low pressure ranges below 0.06 p.s.i.g., as well as other units of high pressure application.

It is another object of the present invention to provide such a transducer having a high level output of 5 volts or more without internal or secondary amplification.

Other objects and features of advantage will be noted in the detailed specification to follow.

Briefly, my invention comprises a pair of thin, closely spaced shield members or assemblies, one fixed and one movable, each member having an aperture or apertures therein, the apertures positioned to form a variable-area light shutter with relative movement of the shield members. A light source is positioned on one side of this shutter and a photocell means on the other side. The movable member is coupled to a sensor drive member movable in response to the characteristic being measured.

In a preferred embodiment, there are two shutter means so formed, each shutter being half open at the zero value of the measured signal, and being so arranged that with a signal increase, one shutter opens more while the other closes more. Two photocell units are then provided, acting in response to the respective shutters to produce a "push-pull" operation.

The photocell means are connected in a suitable electrical circuit to cause a voltage output (for example) in direct accordance with the magnitude of the event or factor to be transduced. Further, the shutter means preferably comprises a series of parallel slots, so that full opening and full closing can be obtained with only a small movement perpendicular to the length dimension of the slots.

This invention may be more fully understood by reference to the following detailed description of a specific embodiment, and to the accompanying illustrative drawings thereof, wherein:

FIGURE 2 is a cross section view of the assembly taken as indicated by broken line 2—2 in FIGURE 1.

FIGURE 3 is an exploded perspective view of the working shutter parts at the heart of this invention.

Figure 1:
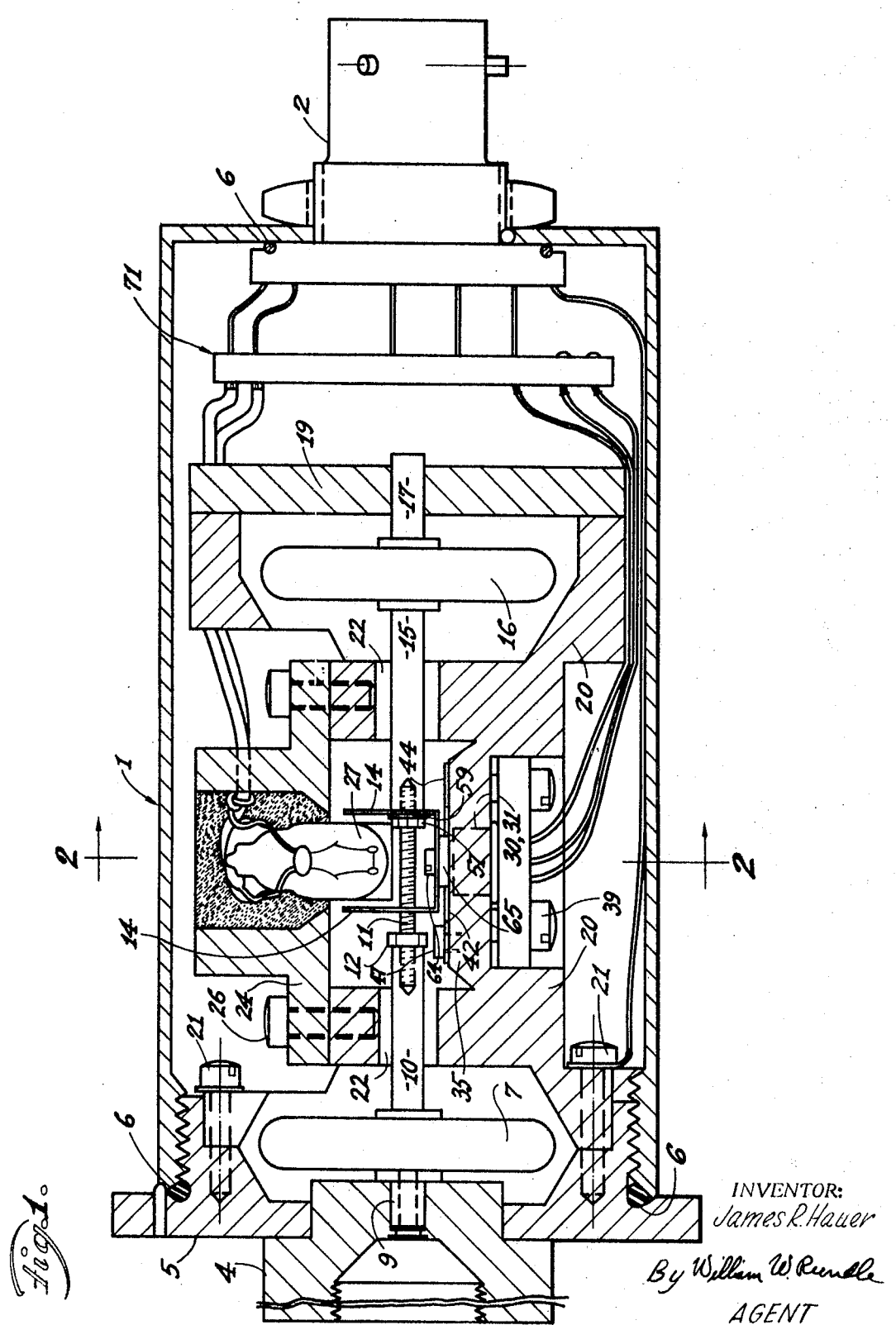
FIGURE 1 is a diagrammatic longitudinal section view of a pressure transducer assembly embodying the present invention.

Referring to FIGURE 1 for a detailed description of a specific apparatus, a pressure transducer is shown as comprising a housing 1, electrical output plug 2 at one end, and pressure input adapter 4 at the other end. Input adapter 4 is secured as by brazing to a threaded end cover 5 which screws into the end of the housing 1. End cover 5 and plug 2 are preferably sealed to housing 1 as by O-rings 6 to prevent entrance of foreign matter and outside light.

Just inside the cover, a first aneroid capsule 7 is secured to a hollow inlet fitting 9 in turn soldered to the adapter 4 so that pressure from a source to be measured (not shown) is admitted from the adapter to the capsule 7. This aneroid capsule 7 is a standard conventional article, designed to expand axially in accordance with applied pressure. The left side of capsule 7 remains at rest relative to housing 1, while the right side moves lengthwise of housing 1.

A solid drive fitting 10 is secured to the right side of capsule 7 and of course closes the same. A threaded drive rod 11 is threaded partially into drive fitting 10 and secured by a nut 12. Rod 11 is connected to a movable light shell 14 as will be described in detail later. Beyond the right-hand side of shield 14, a drive extension 15 is threaded onto drive rod 11 and is secured to one side of a second, reference aneroid capsule 16. The right side of reference capsule 16 is fixed by means of a sealed shaft 17 clamped in a cap member 19.

The cap member 19 is attached to a frame or body 20 which is attached to the end cover 5 by means of three body screws 21 for example. Thus, the left-hand end of first aneroid capsule 7 and the right-hand end of reference capsule 16 are stationary with respect to the instrument housing 1, while the facing "inside" ends of capsules 7 and 16 are integrally movable with the drive rod 11 and movable shield 14 to form a very light-weight and frictionless driven assembly. Axial openings 22 in body 20 allow unrestricted passage of the driven members.

As further shown in FIGURE 2, along the upper side of body 20, a lamp holder 24 is fastened to spaced flat surfaces 25 of body 20 by two lamp screws 26 and contains a lamp 27 preferably potted by shock-absorbing material therein and pointed downwardly at the body center to shine on the movable shield 14.

Along the lower side of body 20, two photoconductor cells 30 and 31 are located in respective bores 32 and 33 spaced laterally of body 20, which bores extend vertically through a body portion 35. A mounting plate 36 retains the cells 30 and 31 in position, the plate 36 being fitted in a body depression 37 and attached to body portion 35 by plate screws 39. Apertures 40 in plate 36 accommodate passage of electrical leads 41 of the photoconductor cells 30 and 31.

The upper side of body portion 35 forms a flat base 42 upon which is mounted a fixed light shield assembly 44. As shown better in FIGURE 3, fixed shield 44 is in two parts, a first half 45 and a second half 46, respectively secured by shield screws 47 (FIGURE 1) passing through oversize screw holes 49 in the halves 45 and 46 and then threaded into the base 42.

FIGURE 3 shows the operating relationships of the lamp 27, light shields 14 and 44, and photo-conductive cells 30 and 31, together with a preferred structure of the light shields. These shields 14 and 44 are of beryllium copper about .003–.004 inch thick. The movable light shield 14 comprises a channel having a driven center section 50 and two essentially fixed end sections 51 delineated by two channel cuts 52 extending almost through the channel from the bottom up.

The left side (looking at FIGURES 1 and 3) of center section 50 has a clearance hole 54 through which passes drive rod 11 without touching. The right side of center section 50 has an integral tab 55 connected only at the bottom face of shield 14, and a rod attach hole 56 in the tab 55. A nut 57 and washer 59 (FIGURE 1) on drive rod 11 fit against the left side of tab 55.

The bottom face of center section 50 contains two laterally spaced aperture areas composed of a plurality of photo-etched lateral light slots 61 and 61a, respectively, thus forming a pair of integrally movable light shutter elements. Light from lamp 27 falls on the entire area of both groups of light slots 61 and 61a. Directly under the movable shutter is a plurality of respective matching light slots 62 and 62a in the fixed shield assembly 44, thus forming a pair of fixed light shutter elements. The preferred clearance spacing between movable and fixed shutters is about one or two thousandths of an inch. The end sections 51 of movable shield 14 are fixedly attached to body base 42 by shield screws 64, using shims 65 (FIGURES 1 and 2) to achieve this operating clearance.

Figure 4:
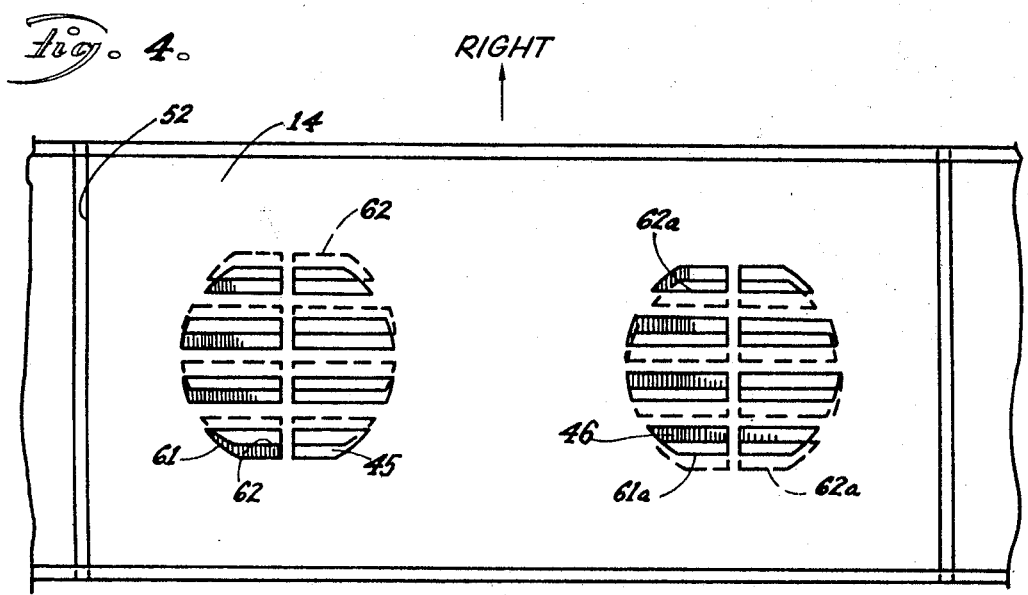
FIGURE 4 is a diagrammatic view looking down on the movable shield, showing the light slot pattern of the movable and fixed shields.

The pattern of the respective light slots is relatively aligned as shown in FIGURE 4 at the time the desired measured pressure is zero. For the sake of clarity, the width of the slots is doubled and the number of slots shown is only half the number used in an actual preferred construction. Here, it will be noted that the slots 62 in first half 45 of the fixed shield 44 are offset one-half slot width to the right from the slots 61 in the movable shield 14, thus forming an open light-transmitting area equal to one-half of the maximum open area of this opposed group of light slots if they were exactly in register. This position is obtained by adjusting the shield first half 45 as allowed by the oversize screw holes 49. In this manner, both halves of the fixed shield 44 can be identical parts.

Similarly, the slots 62a in the second half 46 of fixed shield 44 are offset one-half slot width to the left from the slots 61a in the movable shield 14. The shaded portions appearing in FIGURE 4 represent areas of the fixed light shield halves 45 and 46 partially visible under the movable shield light slots. It is thus seen that in this described zero-signal condition, the intensity of light falling on first photocell 30 from lamp 27 is exactly equal to the light intensity falling on second photocell 31 from this lamp 27. Moreover, it will also be clear that when movable shield 14 is translated to the right, the slots 61 in movable shield 14 form an increased light opening with slots 62, and simultaneously slots 61a form a decreased opening with slots 62a. Therefore, the resistance of first cell 30 will be decreased and the resistance of second cell 31 will be increased.

Figure 5:
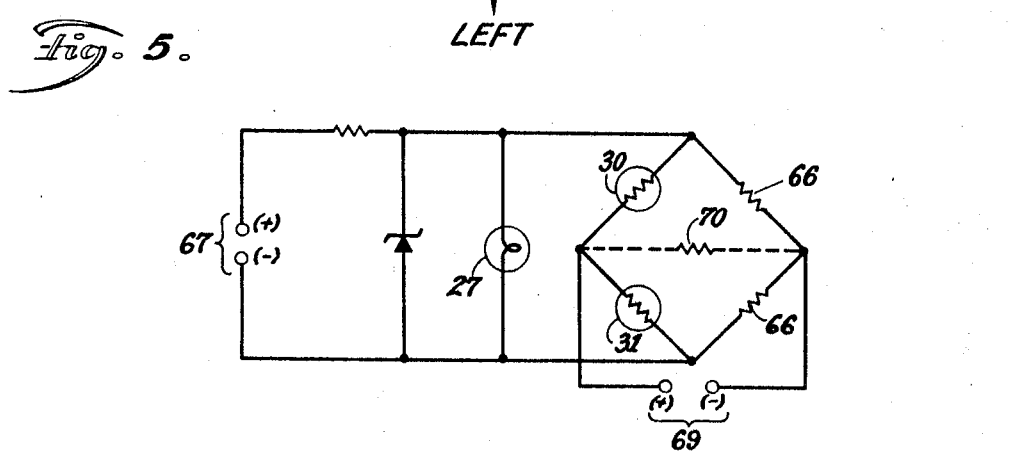
FIGURE 5 is an electrical schematic diagram showing one form of signal-producing circuitry for the transducer.

FIGURE 5 shows a bridge circuit wherein the photocells 30 and 31 may be connected in adjacent legs to produce an output voltage proportional to movable shield movement which is in turn proportional to the pressure being measured. This bridge circuit contains two equal leg resistors 66 in legs opposite the matched cells 30 and 31. It is powered across two opposite corners by regulated D.C. power source 67 which also energizes the lamp 27. Output is taken at terminals 69 across the alternate opposite bridge corners, and a load resistor 70 may be included across these terminals 69 if desired for impedance matching.

The bridge is balanced at zero input pressure, at which time photo-conductive cells 30 and 31 have equal resistances due to the equal light intensity to which they are exposed as described above. The output voltage across terminals 69 is thus zero. In the signal condition mentioned before wherein pressure moves the movable light shield 14 to the right, the first cell 30 resistance is decreased and the second cell 31 resistance is increased, thus producing an unbalanced bridge and an output voltage at terminals 69. The cells 30 and 31 act in an opposite manner similar to the "push-pull" output of two power tubes in an amplifier. Using standard photo-conductive cells, a linear output is obtained.

As shown in FIGURE 1, the space in the right-hand end of housing 1 contains a printed electronic package 71 having the desired circuitry thereon, such as a standard form as shown in FIGURE 5. Wires from the lamp 27 and photocells 30 and 31 lead to this package 71, and power and output leads from package 71 are connected through the electrical plug 2.

Figure 6:
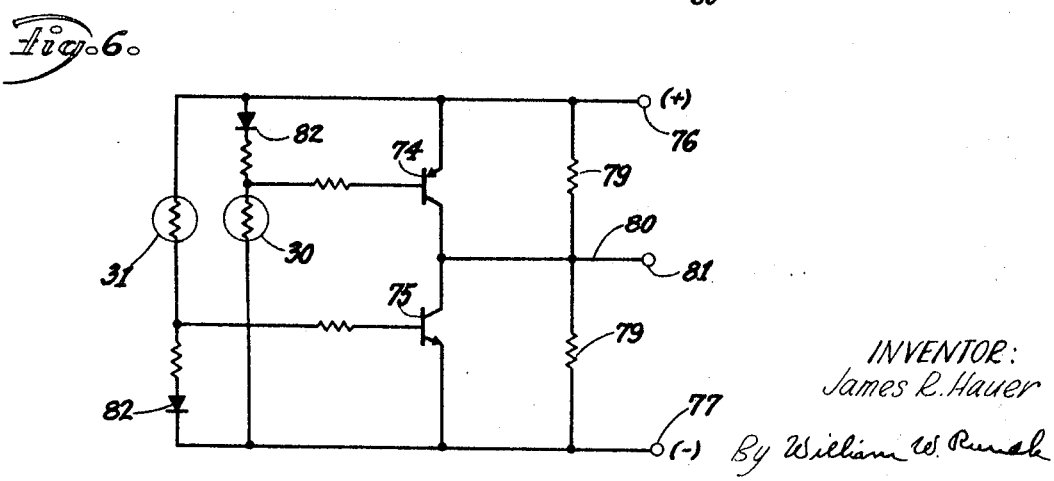
FIGURE 6 is an electrical schematic diagram showing another form of output circuitry usable in this invention.

To convert to a potentiometric output as required, the circuit of FIGURE 6 can be used instead of that in FIGURE 5. In this alternate circuit, the emitter-collector circuits of two complementary type transistors 74 and 75 are connected in series across a D.C. power input comprising a positive supply terminal 76 and a ground terminal 77. Two arm resistors 79 are also connected in series across the same power input, and a common lead 80 terminating in an output terminal 81 is connected to the junction of these latter two resistors and to the common connection between the transistors 74 and 75. The transistors are controlled by the photo-conductive cells 30 and 31 which are connected in effectively opposite legs of a bridge circuit. Thus, the base potentials of the transistors vary in the same direction with a change in input pressure signal, but since the transistors are of opposite type (one PNP and one NPN) they are thereby caused to conduct differentially and therefore change the electrical potential at the output terminal 81.

This output terminal 81 simulates the action of the wiper contact of a potentiometer having as its end points the supply terminal 76 and the ground terminal 77. In the zero or null position, cells 30 and 31 exhibit equal resistance, transistors 74 and 75 conduct equally, and the circuit therefore looks like a potentiometer with the variable wiper arm at its mid-position. When input pressure changes the cell resistances, say in the direction to increase the base current of the upper transistor 74 and decrease the base current of the lower transistor 75, the voltage at output terminal 81 increases. Thus, a system connected to output terminal 81 sees a change identical to that of moving a potentiometer wiper toward the high-signal end. Silicon diodes 82 in the bridge legs may be provided for temperature compensation and to maintain a constant simulated potentiometer resistance during conditions of varying supply voltage.

For example only, the NPN transistor 75 may be a type T.I. 492, and the PNP transistor 74 may be a type 2N1025. The arm resistors 79 may be about 3,300 ohms. The arrangement of the circuit may be modified, however, while still keeping the potentiometer-type operation.

In one preferred embodiment of the present invention, the light slots 61, 61a, 62 and 62a are .005 inch wide, giving a total travel of .0025 inch from zero to the maximum output signal condition. The spring reaction of the movable shield 14 is negligible, and the light weight of the movable parts makes the instrument essentially insensitive to position as far as gravity is concerned. For various desired ranges of input pressure to be measured, a different model of aneroid capsule 7 and 16 is selected. The wall thickness of these capsules provides the various spring rates required as a centering force for the various pressure ranges. A power supply of 28 volts D.C. is preferably used.

For operation as an absolute pressure transducer, the reference aneroid capsule 16 is completely evacuated, shaft 17 being sealed solid, and a vacuum is applied to the input capsule 7 while the light shields 14 and 44 are positionally adjusted for zero output voltage at the output of the electrical indicating circuit. This will be a balanced or null position as shown in FIGURE 4. If the operating range is to be 0 to 15 p.s.i.a., for example, the electrical circuit values are chosen to result in a 0 to 5 volt output signal, for example, thus adapting to a standard telemetering system. A wide range of pressures can be accommodated by the present design, from units having a 0–.06 p.s.i.g. range up to 0–10,000 p.s.i. units, or higher, with .01% accuracy.

For use as a gauge pressure transducer, the reference capsule 16 is ported to ambient atmosphere by means of making shaft 17 hollow and providing a screened tube (not shown) leading from the end of this hollow shaft 17 to the exterior of housing 1. To form a differential pressure transducer, the second input pressure will be ported through shaft 17 to the right-hand side of the second capsule 16.

It will be obvious that a single aneroid capsule 7 can be employed if desired, but the balanced version as described herein is preferred. Further, the aneroid capsules 7, 16 may be replaced by bellows or by elastic pressure-responsive diaphragms secured to the body 20 at their circumference, the input pressure being admitted to the body interior at the input side of the diaphragm installed in place of the first aneroid capsule 7 shown herein. The output side of such diaphragm will of course drive the movable shield 14.

It will also be obvious that the present optical pick-off can be employed in other applications such as an accelerometer, velocity indicator, or mechanical position indicator for instance. In the latter instance, the movable member whose displacement is to be measured will merely be connected directly to translate an input shaft at the axis of this invention. A light duty spring return member can easily be employed to act on the movable elements of this signal transducer if desired.

As mentioned hereinbefore, the electrical output signal is linearly proportional to displacement of the movable shield 14 which is in turn linearly proportional to input pressure. In some types of transducers, it will be recognized that a non-linear function may be involved. For this purpose, the light slots in one or the other or both of the shutter elements can be curved, oval, circular, trapezoidal, triangular, or other shape to produce a nonlinear variation of light intensity on the photocells with movement of the drive rod 11. Thus, an altitude indicating transducer can be provided, for example. In other words, the slot shapes would be designed by a person skilled in the art to vary the light passed in accordance with a given curve of the required function. Similarly, other kinds of photocell devices may be utilized without departing from the major principles of this invention, i.e., photovoltaic cells, photo-transistors, solar type cells and the like.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:
1. An optical transducer comprising:
 (a) a body;
 (b) a sensor mounted in said body and having a linearly movable output member;
 (c) movable shutter means connected to said output member, said movable shutter means having two separable aperture areas therein, each aperture area composed of a plurality of narrow slots extending substantially perpendicular to the direction of movement of said shutter means;
 (d) fixed shutter means mounted in said body, said fixed shutter means having two separate aperture areas therein substantially matching said aperture areas in said movable shutter means, said aperture areas in said fixed shutter being opposite their respective aperture areas in said movable shutter and spaced therefrom by a substantially small clearance;
 (e) the slots in said movable shutter means being substantially half covered by the slots in said fixed shutter means in a null position of said transducer corresponding to a zero input signal position of said sensor, said slots in said fixed shutter means being oppositely staggered with respect to said slots in said movable shutter means whereby the slots in one apertured area of each said shutter means are progressively opened while the slots in the other apertured area are progressively closed during unidirectional movement of said movable shutter means;
 (f) a light source mounted on said body in view of said apertured areas in one of said shutter means;
 (g) a first light-responsive means mounted in said body on the opposite side of said shutter means from said light source and in view of only one apertured area in the other said shutter means;
 (h) a second light-responsive means similarly mounted in said body in view of only the other apertured area in said other shutter means;
 (i) electrical signal producing means incorporating said light-responsive means to produce a signal proportional to amount of movement of said movable shutter means; and
 (j) a second sensor mounted in said body and connected to said movable shutter means in opposition to the first said sensor.

2. An optical pick-off transducer comprising:
 (a) a body;
 (b) a sensor having one portion thereof fixed with respect to said body and an output portion thereof linearly movable along an output axis in said body in accordance with an input signal to be measured;
 (c) a drive member connected to said output portion and centered on said axis;
 (d) movable shutter means comprising a single-piece shield member having a movable portion and a fixed portion, said movable portion attached to said drive member, said movable portion being flexible with respect to said fixed portion in the direction of motion of said drive member only;
 (e) a light aperture in said movable portion;
 (f) fixed shutter means mounted in said body and having a light aperture therein cooperating with the aperture in said movable shutter means to form a variable-area light path;
 (g) said fixed portion of said shield member attached to said body to space said apertures by a small clearance, whereby none of the movable elements have any rubbing or touching friction contact areas whatsoever;
 (h) a light source mounted in said body on one side of said shutter means; and (i) light-responsive means in said body on the opposite side of said shutter means.

3. An optical transducer comprising:
(a) a body;
(b) sensor means having an output member movable with respect to said body;
(c) movable shutter means including a substantially U-shaped channel of thin resilient material mounted perpendicular to the direction of movement of said output member, said channel divided into three lengthwise portions by two cross cuts through the base of said channel and extending up the sides at least about halfway thereof, an aperture in the base of the central portion thus formed;
(d) drive means connecting said output member to one side of said central portion whereby said central portion is moved relative to the end portions;
(e) fixed shutter means mounted on said body, an aperture in said fixed shutter means cooperating with said aperture in said movable shutter means to form a variable-area light path;
(f) means fastening the end portions of said channel to said body to determine a clearance between said movable and fixed shutters;
(g) a light source mounted on said body in view of the aperture in one of said shutter means; and
(h) light-responsive means in said body on the opposite side of said shutter means from said light source and in view of the aperture in the other said shutter means, whereby movement of said output member causes a proportional response of said light-responsive means by flexing of said movable shutter means with no sliding friction areas between any relatively moving elements.

4. An optical pick-off transducer comprising:
(a) a body;
(b) a sensor having one portion thereof fixed with respect to said body and an output portion thereof linearly movable along an output axis in said body in accordance with an input signal to be measured;
(c) a drive member connected to said output portion and centered on said axis;
(d) movable shutter means comprising a single-piece shield member having a movable portion and a fixed portion, said movable portion attached to said drive member, said movable portion being flexible with respect to said fixed portion in the direction of motion of said drive member only;
(e) two separate light aperture areas in said movable portion of said movable shutter means, each aperture area composed of a plurality of narrow slots extending substantially perpendicular to the direction of movement of said movable portion;
(f) fixed shutter means mounted in said body, said fixed shutter means having two separate aperture areas therein substantially matching said aperture areas in said movable shutter means, said aperture areas in said fixed shutter being opposite their respective aperture areas in said movable shutter means;
(g) said fixed portion of said shield member firmly attached to said body to space said aperture areas in said movable shutter means from said aperture areas in said fixed shutter means by a small clearance, whereby none of the movable elements have any rubbing or touching friction contact whatsoever with the fixed elements;
(h) the slots in said movable shutter means being substantially half covered by the slots in said fixed shutter means in a null position of said transducer corresponding to a zero input signal position of said sensor, said slots in said fixed shutter means being oppositely staggered with respect to said slots in said movable shutter means whereby the slots in one apertured area of each said shutter means are progressively opened while the slots in the other apertured area are progressively closed during unidirectional movement of said movable shutter means;
(i) a light source mounted in said body on one side of said shutter means; and
(j) two separate light-responsive means mounted in said body on the opposite side of said shutter means from said light source, said two light-responsive means being respectively in view of only one apertured area in said shutter means.

References Cited

UNITED STATES PATENTS

| 2,122,818 | 7/1938 | Ladrach | 250—231 X |
| 2,358,571 | 7/1944 | Hall | 250—231 X |
| 2,666,650 | 1/1954 | MacDonell | 250—231 X |

FOREIGN PATENTS 834,021  5/1960  Great Britain.

ROBERT SEGAL, Primary Examiner

U.S. Cl. X.R.

250—235, 237